(12) United States Patent
Shaikh et al.

(10) Patent No.: US 10,253,814 B2
(45) Date of Patent: Apr. 9, 2019

(54) BEAD SEALS FOR ROLLING BEARINGS

(71) Applicant: SCHAEFFLER TECHNOLOGIES AG & CO. KG, Herzogenaurach (DE)

(72) Inventors: Shakeel Shaikh, Windsor (CA); Shawn Leasa, Stratford (CA)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/660,112

(22) Filed: Jul. 26, 2017

(65) Prior Publication Data
US 2019/0032717 A1 Jan. 31, 2019

(51) Int. Cl.
F16C 19/08 (2006.01)
F16C 33/76 (2006.01)
F16C 43/04 (2006.01)
B60B 27/00 (2006.01)
F16J 15/32 (2016.01)
F16C 33/72 (2006.01)
(Continued)

(52) U.S. Cl.
CPC ........ F16C 33/723 (2013.01); B60B 27/0005 (2013.01); B60B 27/0073 (2013.01); F16C 19/06 (2013.01); F16C 33/76 (2013.01); F16C 33/7886 (2013.01); F16C 33/7889 (2013.01); F16C 43/04 (2013.01); F16J 15/32 (2013.01); F16C 2326/06 (2013.01)

(58) Field of Classification Search
CPC ........ F16C 19/06; F16C 43/04; F16C 33/723; F16C 33/76; F16C 33/7823; F16C 33/7889; F16C 33/7836; F16C 2220/04; F16C 2326/06; B60B 27/0005; B60B 27/0073; F16J 15/32; F16D 3/385
USPC ....... 384/477, 484, 537, 579, 544, 589, 488; 277/349, 350, 370, 376, 380, 382, 402
See application file for complete search history.

(56) References Cited

U.S. PATENT DOCUMENTS 2,221,554 A * 11/1940 Okun ................. F16C 33/78
 277/369
2,419,385 A * 4/1947 Beier ................. F16J 15/36
 277/384
(Continued)

FOREIGN PATENT DOCUMENTS

DE 102013218635 A1 * 3/2015 ............ F16C 33/805
DE 102014203210 A1 8/2015
(Continued)

Primary Examiner — Marcus Charles
(74) Attorney, Agent, or Firm — Antun M. Peakovic

(57) ABSTRACT

Bead seals and methods of forming the same are disclosed for bearing assemblies. A bearing assembly may include an inner ring, an outer ring, and a plurality of rolling elements supported therebetween. An annular seal may be disposed between the inner and outer rings, the seal including a metal portion having a mating surface configured to contact a wall of the inner ring. A bead seal may be secured to the mating surface and may extend around a circumference of the seal, the bead seal contacting and forming a seal between the mating surface and the wall of the inner ring. The bead seal may be secured to/within a groove formed in the mating surface. The bead seal may be over-molded on the groove. The disclosed bead seal(s) may reduce or replace other sealants or sealing members in the assembly.

5 Claims, 4 Drawing Sheets

(51) Int. Cl.
*F16C 19/06* (2006.01)
*F16C 33/78* (2006.01)

(56) References Cited

U.S. PATENT DOCUMENTS

| | | | |
|---|---|---|---|
| 3,595,586 A * | 7/1971 | Anderson | F16J 15/32 277/353 |
| 3,639,016 A * | 2/1972 | Bourgeois | F16C 33/6618 277/349 |
| 4,372,628 A * | 2/1983 | Kiener | B60B 27/0005 384/476 |
| 8,790,017 B2 * | 7/2014 | Ohtsuki | B60B 27/0005 384/544 |
| 9,546,687 B2 | 1/2017 | Kaiser et al. | |
| 2008/0036156 A1 * | 2/2008 | Niebling | F16C 33/7879 277/579 |
| 2011/0221136 A1 * | 9/2011 | Dudek | F16J 15/3488 277/306 |
| 2013/0044972 A1 * | 2/2013 | Ohtsuki | B60B 27/0005 384/448 |
| 2013/0127119 A1 * | 5/2013 | Haepp | F16C 33/7863 277/351 |
| 2016/0017925 A1 * | 1/2016 | Arnault | F16C 33/761 384/607 |
| 2016/0178010 A1 * | 6/2016 | Kaiser | F16C 33/805 277/351 |
| 2016/0201830 A1 * | 7/2016 | Le Quere | F16J 15/32 285/349 |
| 2017/0082153 A1 * | 3/2017 | Hess | F16C 33/7809 |

FOREIGN PATENT DOCUMENTS

| | | | | |
|---|---|---|---|---|
| DE | 102014211191 A1 | | 12/2015 | |
| DE | 102014224629 A1 | * | 6/2016 | F16C 33/7823 |
| JP | 2014052070 A | * | 3/2014 | F16J 15/32 |
| JP | 2014240679 A | * | 12/2014 | F16C 33/7879 |
| JP | 6228756 B2 | * | 11/2017 | B60B 35/18 |
| KR | 2016058615 A | * | 5/2016 | F16C 33/805 |

* cited by examiner

BEAD SEALS FOR ROLLING BEARINGS

TECHNICAL FIELD

The present disclosure relates generally to bead seals, for example, for rolling bearings to retain grease and prevent ingress of contaminants.

BACKGROUND

Bearing assemblies generally include a plurality of rolling elements sandwiched between opposing raceways in bearing rings. The rolling elements may take many forms, such as spherical balls, rollers, tapered rollers, barrel-shaped spherical rollers, or others. Bearing assemblies are used in a wide range of applications. For example, in vehicles, bearing assemblies may be used for supporting an intermediate drive shaft (IDS) or a drive shaft (prop shaft). They may also be used in wheel bearing assemblies in which they bear a wheel hub that may be driven by a drive element. Seals may be included in the bearing assembly to reduce or eliminate ingress of contaminants into the bearing and/or to prevent lubricants (e.g., oil or grease) from leaking out of the bearing. However, even with these seals, some flow of material (either in or out) may occur.

SUMMARY

In at least one embodiment, a bearing assembly is provided. The bearing assembly may include an inner ring, an outer ring, and a plurality of rolling elements supported therebetween; an annular seal disposed between the inner and outer rings, the seal including a metal portion having a mating surface configured to contact a wall of the inner ring; and a bead seal secured to the mating surface and extending around a circumference of the seal, the bead seal contacting and forming a seal between the mating surface and the wall of the inner ring.

The bead seal may be formed of an elastomeric material. In one embodiment, the mating surface has an annular groove defined therein and the bead seal is disposed within the groove. The bead seal may be over-molded onto the mating surface. In one embodiment, the mating surface is oriented in a direction substantially perpendicular to a radial direction of the bearing assembly. In another embodiment, the seal may include a metal portion having a mating surface configured to contact a wall of the outer ring. A bead seal may be secured to the mating surface and extend around a circumference of the seal, the bead seal contacting and forming a seal between the mating surface and the wall of the outer ring. The mating surface configured to contact the wall of the inner ring and the mating surface configured to contact the wall of the outer ring may each have an annular groove defined therein and the bead seals may be disposed within the grooves.

In another embodiment, the bearing assembly is a wheel bearing assembly and the inner ring is integrally formed with a wheel bearing flange oriented in a direction substantially parallel to a radial direction of the bearing assembly. The metal portion may include a first mating surface oriented in the direction substantially parallel to the radial direction and a second mating surface oriented in a direction substantially perpendicular to the radial direction. The first and second mating surfaces may be configured to contact corresponding first and second walls of the inner ring, and a bead seal may be secured to each of the first and second mating surfaces. The bead seals may contact and form a seal between the first and second mating surfaces and the first and second walls of the inner ring, respectively. The first and second mating surfaces may each have an annular groove defined therein and the bead seals may be disposed within the grooves.

In at least one embodiment, a method is provided. The method may include forming a seal including a metal portion having a mating surface configured to contact a wall of an inner ring of a bearing assembly; securing a bead seal to the mating surface around a circumference of the seal; and introducing the seal into the bearing assembly such that the bead seal contacts and forms a seal between the mating surface and the wall of the inner ring.

Securing the bead seal to the mating surface may include over-molding the bead seal on the mating surface. In one embodiment, forming the seal including the metal portion includes forming an annular groove around a circumference of the mating surface and securing the bead seal to the mating surface includes positioning the bead seal in the groove. The method may further include forming a second metal portion of the seal having a second mating surface configured to contact a wall of the inner ring or a wall of the outer ring; securing a second bead seal to the second mating surface around a circumference of the seal; and introducing the seal into the bearing assembly such that the second bead seal contacts and forms a seal between the second mating surface and either the wall of the inner ring or the wall of the outer ring. In one embodiment, the bearing assembly is a wheel bearing assembly and the mating surface is configured to contact a wall of the inner ring that is oriented parallel to a radial direction of the wheel bearing assembly and the second mating surface is configured to contact a wall of the inner ring that is oriented perpendicular to the radial direction. In another embodiment, the mating surface is configured to contact a wall of the inner ring that is oriented perpendicular to a radial direction of the bearing assembly and the second mating surface is configured to contact a wall of the outer ring that is oriented perpendicular to the radial direction.

In at least one embodiment, a wheel bearing assembly is provided. The assembly may include an inner ring, an outer ring, and a plurality of rolling elements supported therebetween; a wheel bearing flange integrally formed with the inner ring and oriented in a direction substantially parallel to a radial direction of the wheel bearing assembly; an annular seal disposed between the inner and outer rings, the seal including a metal portion having a mating surface configured to contact a wall of the inner ring; and a bead seal secured to the mating surface and extending around a circumference of the seal, the bead seal contacting and forming a seal between the mating surface and the wall of the inner ring.

In one embodiment, the wall of the inner ring may be a wall of the wheel bearing flange that is oriented in the radial direction and the mating surface may also be oriented in the radial direction. In another embodiment, the wall of the inner ring may be oriented in a direction perpendicular to the radial direction and the mating surface may also be oriented in a direction perpendicular to the radial direction. The mating surface may have an annular groove defined therein and the bead seal may be over-molded within the groove.

BRIEF DESCRIPTION OF THE DRAWINGS

The nature and mode of operation of the disclosure will now be more fully described in the following detailed description of the disclosure taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
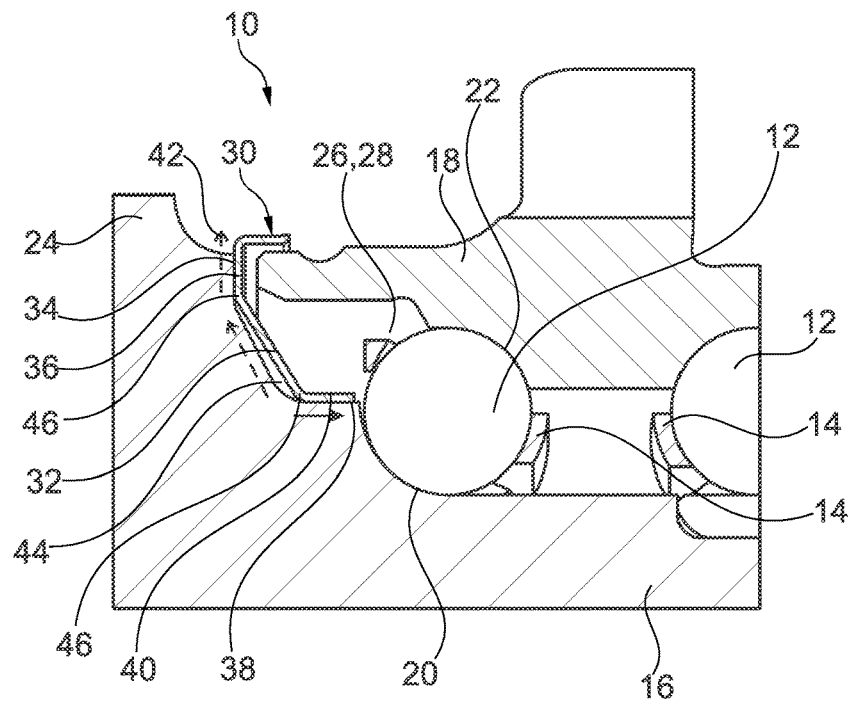
FIG. 1 is a cross-section of a wheel bearing assembly, according to an embodiment.

With reference to FIG. 1, a wheel bearing assembly 10 is shown. The wheel bearing assembly 10 may be designed for a vehicle. The wheel bearing assembly 10 may include one or more rolling elements 12, which may include spherical balls, rollers, tapered rollers, barrel-shaped spherical rollers, or others. In the embodiment shown, the wheel bearing assembly 10 includes two sets of rolling elements 12, which may be referred to as a double-row bearing. However, the wheel bearing assembly may include only a single row or it may include multiple rows (e.g., two or more). The rolling elements 12 may be held in place by cages 14.

The wheel bearing assembly 10 may include an inner ring 16 and an outer ring 18. The inner ring 16 may define an inner race 20 and the outer ring 18 may define an outer race 22. In the embodiment shown, the inner ring 16 may be connected to a wheel bearing flange 24. The inner ring 16 and the wheel bearing flange 24 may be integrally connected, such that they are formed as a single component (e.g., without fasteners, adhesives, etc.). If integrally connected, the wheel bearing flange 24 may be defined as (or including) a portion of the inner ring 16 extending/oriented in the radial direction (vertically, as shown).

The outer ring 18 may be connected to a wheel carrier (not shown) in its installed state. Accordingly, the outer ring 18 may be stationary (e.g., a stator) and the inner ring 16 may be configured to rotate (e.g., a rotor). However, the embodiment shown is merely an example, and the relative rotation may change depending on the bearing application or particular design. Within the wheel bearing assembly 10, there may be hollow spaces 26. The hollow spaces 26 may be partially or completely filled with a lubricant 28. The lubricant may be any suitable bearing lubricant, such as oil or grease.

A seal 30 may be disposed between the inner ring 16 and the outer ring 18. The seal may be designed to prevent ingress and/or egress of material between the hollow spaces 26 and the outside environment. For example, the seal 30 may be intended to prevent water, dirt, or other contaminants from entering the bearing assembly from the environment, while also preventing the lubricant 28 from escaping the bearing assembly.

The seal 30 may include a flinger 32, which may also be referred to as a splash plate, a slinger, or a thrower. The flinger 32 may be formed partially or completely of metal. The flinger 32 may be in contact with the inner ring 16 and/or flange 24 in at least one location, when inserted/installed. The seal 30 may include additional elements, such as sealing lips, seal labyrinths, or other features known to those of ordinary skill in the art. These elements may be any combination of metal, elastomer (e.g., rubber), nitrile, or other materials, as known in the art. For illustrative purposes, these additional elements have been removed and only the flinger 32 is shown. While the flinger 32 is shown and described as in contact with the inner ring 16 and/or flange 24, in other bearing assembly designs/configurations the flinger may be in contact with the outer ring 18.

In one embodiment, the flinger 32 may contact a radial wall 34 of the flange 24 (which may be part of the inner ring 16). The radial wall 34 may be oriented parallel or substantially parallel (e.g., ±5 degrees) to the radial direction where a region 36 of the flinger 32 is in contact (e.g., vertical, as shown). The region 36 may be similarly oriented parallel or substantially parallel to the radial direction. Accordingly, the region 36 may include a mating surface that is parallel or substantially parallel to the wall (e.g., radial wall 34). The flinger 32 may also (or alternatively) be in contact with the inner ring 16 (and/or flange 24) at a wall 38 that is oriented perpendicular or substantially perpendicular (e.g., ±5 degrees) to the radial direction at a region 40 of the flinger 32 (e.g., horizontal, as shown). The region 40 may be similarly oriented perpendicular or substantially perpendicular to the radial direction. Accordingly, the region 40 may include a mating surface that is parallel or substantially parallel to the wall (e.g., wall 38). While one example flinger configuration is shown, one of ordinary skill in the art will understand that other configurations or modifications may be made. Other flinger examples (referred to as a splash plate) are shown and described in U.S. Pat. No. 9,546,687, the disclosure of which is incorporated in its entirety herein by reference.

Accordingly, there may be one or more regions where the flinger 32 is conformal or parallel with a wall of the inner ring 16 (including flange 24). In theory, conformal contact or mating regions should form a water/liquid-tight seal between the flinger 32 and the inner ring 16/flange 24. However, in practice, a leak path 42 may develop if there is even a small gap or spacing between the flinger 32 and the inner ring 16. Without being held to any particular theory, it is believed that the flinger 32, which may be stamped metal (e.g., steel), may exhibit a spring-back effect, which may cause the flinger 32 (e.g., regions 36 or 40) to lose contact with the wall of the inner ring (e.g., walls 34 or 38). Other potential causes of leak paths may include scratches or grooves in the walls of the inner ring/flange and/or the outer surface of the flinger. It has been found that a scratch or groove of only a few microns in depth may be sufficient to allow some leakage.

To address fluid flow through the leakage path 42, one approach has been to introduce a sealant in the gap or hollow space 44 between the flinger 32 and the inner ring. This gap 44 may be between where walls 34 and 38 contact the regions 36 and 40, respectively, of the flinger 32. In one embodiment, there may be a press-in line 46 or crease at a radially bottom of the region 36 and/or an outer side of the region 40 (e.g., towards the flange) where the flinger 32 changes from radially parallel or perpendicular to oblique or angled. The gap 44 may be defined between these press-in lines 46. While the sealant may reduce the leakage through the leak path 42, it may not completely eliminate it. For example, the sealant may lose contact with the flinger and/or the wall during the press in operation or over time.

Figure 2:
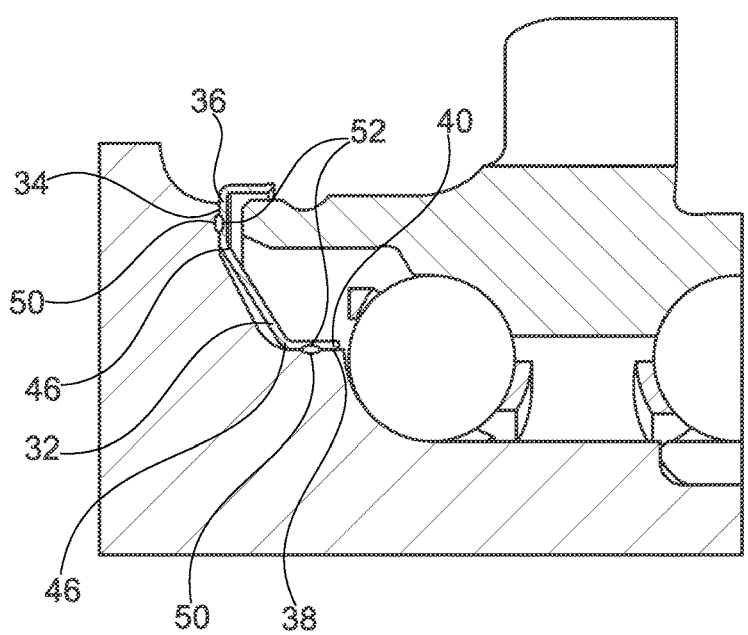
FIG. 2 is a cross-section of a wheel bearing assembly including bead seals on a flinger, according to an embodiment.

With reference to FIG. 2, in at least one embodiment, the flinger 32 may include one or more bead seals 50 thereon. A bead seal may refer to a seal having a relatively small length/size in the axial direction and in the radial direction. In axial cross-section (e.g., perpendicular to the bearing axis) the bead seal(s) 50 may have a rounded shape, such as circular, oval, or ellipse, however, other shapes may also be used. The bead seal(s) 50 may block the transport of liquid through the leak path 42. In one embodiment, the bead seals 50 may be over-molded onto the flinger 32. However, other methods of attachment may also be possible, such as using adhesives. The bead seal may also be held in place without adhesives or other rigid/fixed attachment, such as an O-ring stretched around the flinger 32 and held in place by a groove. The bead seals 50 may be formed of a polymeric material. In one embodiment, the bead seals 50 may be formed of an elastomeric material, such as rubber (e.g., Buna or Viton) or polyurethane elastomer. However, any material suitable for forming a seal with the inner ring 16 may be used. In one embodiment, the bead seal(s) 50 may be the only non-metallic sealing material of the flinger 32 that is in contact with the inner ring 16. For example, the bead seal(s) 50 may be the only rubber/elastomer component of the flinger 32 that is in contact with the inner ring 16 when the flinger 32 is installed.

In one embodiment, a bead seal 50 may be disposed on a region of the flinger 32 that extends in the radial direction, such as region 36. In another embodiment, a bead seal 50 may be disposed on a region of the flinger 32 that extends perpendicular to the radial direction, such as region 40. In another example, a bead seal 50 may be disposed in multiple regions of the flinger 32, such as in regions both in the radial direction and perpendicular thereto (e.g., in both regions 36 and 40). Accordingly, the one or more bead seals 50 may be disposed in regions of the flinger 32 that are configured to form a mating or sealing surface with an opposing surface of the inner ring 16/flange 24. The flinger 32 may be press-fit, or otherwise inserted/introduced, into the inner ring 16/flange 24. During/upon insertion of the flinger 32, the bead seal(s) 50 may be compressed. This may form an interference fit between the bead seal and the opposing surface (e.g., inner ring), creating a leak-resistant seal.

In the embodiment, shown, the bead seals 50 may be disposed or formed on regions 36 and/or 40. As described above, these regions may be oriented either parallel or perpendicular to the radial direction (vertical in the Figures). However, other orientations may be possible. In one embodiment, the bead seal may be between any two conformal or parallel mating surfaces of the flinger and the inner ring. In another embodiment, the bead seal 50 may be disposed radially outward of a press-in line 46, such as the most radially outward press-in line. For the bead seal 50 on the radially perpendicular surface of the flinger 32, the bead seal may be axially inward of a press-line 46, such as the most axially inward press-line. As used herein, axially inward may refer to a direction towards the rolling elements 12 and/or away from the flange 24. The bead seals 50 may extend around a circumference of the flinger 32. In one embodiment, the bead seal 50 may extend around the entire circumference of the flinger (e.g., 360 degrees).

While the examples of these regions are shown as radially extending region 36 and radially perpendicular region 40, both extending generally perpendicular to a central axis (not shown) of bearing 10, there may be other surfaces of the flinger configured to be in contact with the inner ring 16/flange 24. For example, a region of the flinger 32 between the press-in lines 46 may be configured to contact a similarly angled wall of the inner ring 16. Accordingly, a bead seal 50 may be disposed on any region of the flinger 32 that is configured to have a continuous contact surface with the inner ring 16/flange 24 (e.g., where the two components have matching or corresponding shapes or contours such that they are configured to be flush with each other).

In at least one embodiment, the flinger 32 may have a groove or channel 52 defined therein that is configured to receive the bead seal 50. If there are multiple bead seals 50, then there may be multiple grooves 52 (e.g., one per bead seal). The groove 52 may be a locating feature for the bead seal 50, as well as a retaining feature. By locating the bead seal 50 in a depressed portion of the flinger 32, the bead seal 50 may be more resistant to being dislodged when the flinger 32 is inserted or introduced into the assembly 10. While a single bead seal 50 and groove 52 are shown in each region (e.g., 36 and 40), there may be multiple bead seals and grooves in one or both regions (e.g., two or more bead seals and corresponding grooves). If there are multiple bead seals in one region, they may be spaced apart in that region. In one embodiment, the flinger 32 may be made of metal, such as steel. In these instances, the flinger 32 may be a stamped component. In one embodiment, the groove(s) 52 may be formed in the flinger 32 during the stamping operation. For example, the stamping tooling may be shaped and configured to form the groove(s) 52 in the flinger 32 during the stamping process. However, any suitable technique may be used to form the grooves (e.g., such as machining).

In one embodiment, the flinger 32 may have groove(s) 52 formed therein, but the opposing surface of the inner ring 16/flange 24 may be flat/smooth or substantially flat/smooth (e.g., no groove). The inner ring may be formed of metal, also, but may be formed by a different process than stamping. For example, the inner ring may be formed by machining, casting, rolling, hydrodynamic forming, pressing, etc. Accordingly, it may be more difficult or costly to add a groove to the wall of the inner ring or flange than to the flinger itself. However, in some embodiments, grooves 52 may be formed in the wall of the inner ring 16 or flange 24 (e.g., walls 34 or 38). In these embodiments, the grooves 52 may be configured to be opposite the grooves 52 in the flinger 32 or the flinger 32 may not have grooves therein.

Accordingly, the disclosed bead seals may improve the lubrication retention and contamination exclusion of a wheel bearing assembly. The bead seals may be positioned in regions of a seal flinger where a seal is intended to be formed by the metal flinger and a surface of the metal inner ring or flange. However, in some instances, there may not be a perfect sealing fit between the flinger and the inner ring, for example, due to spring back of a stamped flinger. The bead seal may allow for a liquid-tight seal to be formed between the two components even with some dimensional variations or changes. This may prevent the formation of a leak path from within the bearing assembly to the environment, which may keep the bearing lubrication in and prevent ingress of contaminants, such as water or debris. However, while the bead seals are described and shown as incorporated into a wheel bearing assembly, they may be applicable to any bearing assembly where improved sealing may be beneficial, particularly for designs including metal-on-metal sealing components. In addition, the disclosed bead seals may be used in non-bearing applications, for example, any application where including metal-on-metal sealing components are present.

Figure 3:
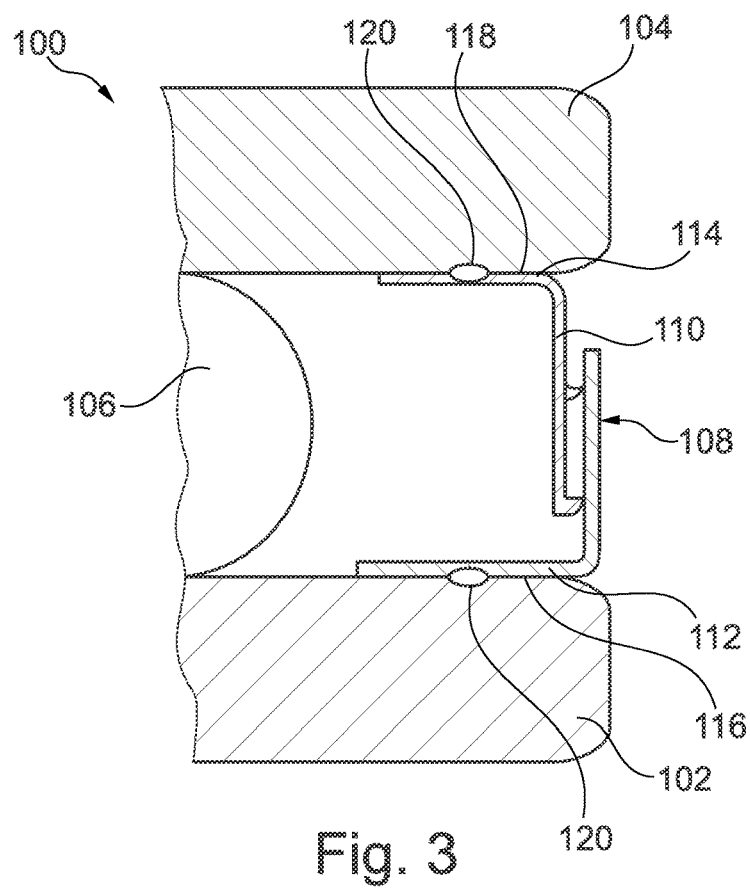
FIG. 3 is a cross-section of a roller bearing assembly including bead seals on a seal, according to an embodiment.

With reference to FIGS. 3-6, several embodiments are shown of bead seals incorporated into seals for roller bearings. With reference to FIG. 3, a roller bearing assembly 100 is shown. The assembly 100 includes an inner ring 102, an outer ring 104, and a plurality of rolling elements 106 supported therebetween. The rolling elements 106 may be any type of rolling elements, as described above, and are illustrated as spherical elements. A seal 108 is disposed between the inner and outer rings to reduce or prevent contaminants from entering the bearing assembly and/or to retain lubricants therein from leaking out. The seal 108 may have a metal body 110 and a pair of spaced apart annular projections 112 and 114 extending inward towards the rolling elements 106 (e.g., perpendicular to the radial direction). The seal 108 may include additional elements to those shown, such as sealing lips, wipers, etc., which may be formed of an elastomer (e.g., rubber).

The projections 112 and 114 may be configured to contact and form a seal with the inner ring 102 and outer ring 104, respectively. For example, the projection 112 may be configured to contact and form a seal with a radially outward surface 116 of the inner ring 102 and the projection 114 may be configured to contact and form a seal with a radially inward surface 118 of the outer ring 104. Similar to the wheel bearing assembly 10, a bead seal 120 may be disposed on one or both of the projections 112 and 114. The bead seals 120 may extend around a circumference of the projection, for example, completely around the circumference (e.g., 360 degrees). One bead seal 120 may therefore form a seal between the projection 112 and the radially outward surface 116 and a second bead seal may form a seal between the projection 114 and the radially inward surface 118. Similar to above, while a single bead seal 120 is shown for each projection, there may be multiple bead seals for each projection. If there are multiple bead seals, they may be spaced along the projection.

Figure 4:
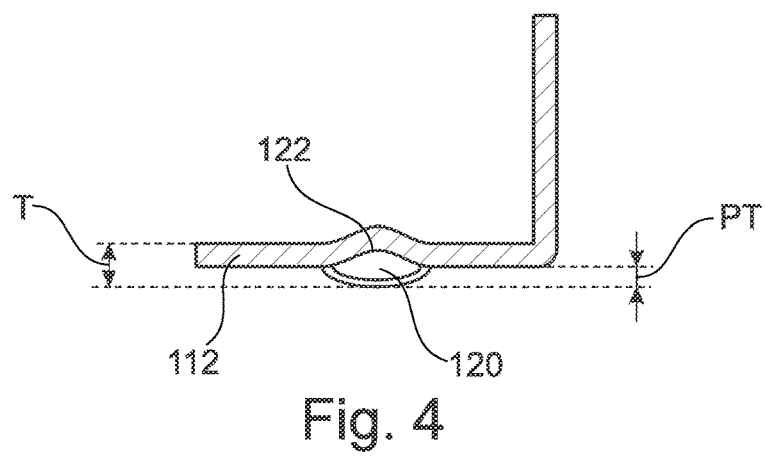
FIG. 4 is an enlarged view of a portion of FIG. 3 showing a bead seal groove, according to an embodiment.

With reference to FIG. 4, an enlarged view of the projection 112 is shown having a bead seal thereon (e.g., over-molded). In this embodiment, a groove 122 is formed in the outer surface (e.g., the sealing surface) of the projection 112 to retain and/or locate the bead seal 120. The groove 122 may be similar to the groove 52 described above for the wheel bearing assembly 10, and will not be described in detail again. The groove 122 may be formed into the projection 112 during a stamping process, or by any other suitable method.

Similar to the inner ring in the wheel bearing assembly, the sealing surfaces of the inner and outer rings may not include a groove corresponding to, or opposite, groove 122. These ring surfaces may be smooth or flat and, like the inner ring 16, may be formed using a process that is not readily conducive to forming a groove. Accordingly, the bead seal 120 may be secured to and may reside in a groove 122 on the projection and may be in contact with a smooth/flat wall of the inner or outer ring. However, in some embodiments, a corresponding groove may be formed in the inner/outer ring.

The bead seals disclosed herein may have any suitable thickness (e.g., the dimension between the seal and the opposing surface, such as the bearing ring). In at least one embodiment, the bead seal may have a thickness T of 0.1 to 1 mm, or any sub-range therein, such as 0.1 to 0.7 mm, 0.2 to 0.7 mm, 0.1 to 0.5 mm, or others. The thickness of the bead seal may depend on the size/depth of the groove 122, the compressibility of the seal material, or other factors. The bead seal may also have a protruding thickness PT, which may be the length the bead seal extends beyond the surrounding surface of the seal (e.g., the region 36/40 or the protrusion 112/114). In one embodiment, the protruding thickness of the bead seal may be from 0.05 to 0.5 mm, or any sub-range therein, such as 0.05 to 0.3 mm, 0.1 to 0.5 mm, 0.1 to 0.3 mm, about 0.2 mm (e.g., ±0.05 mm), or others. The protruding depth may depend on factors such as the compressibility of the seal material and the depth of the groove. If the protruding depth is too large, there may not be sufficient room in the groove for the seal to compress and it may shear off during insertion. If the protruding depth is too small, there may not be sufficient compression to create pressure/interaction with the inner ring to create and maintain the seal. The depth of the groove may be defined as the thickness minus the protruding thickness (T−TP).

Figure 5:
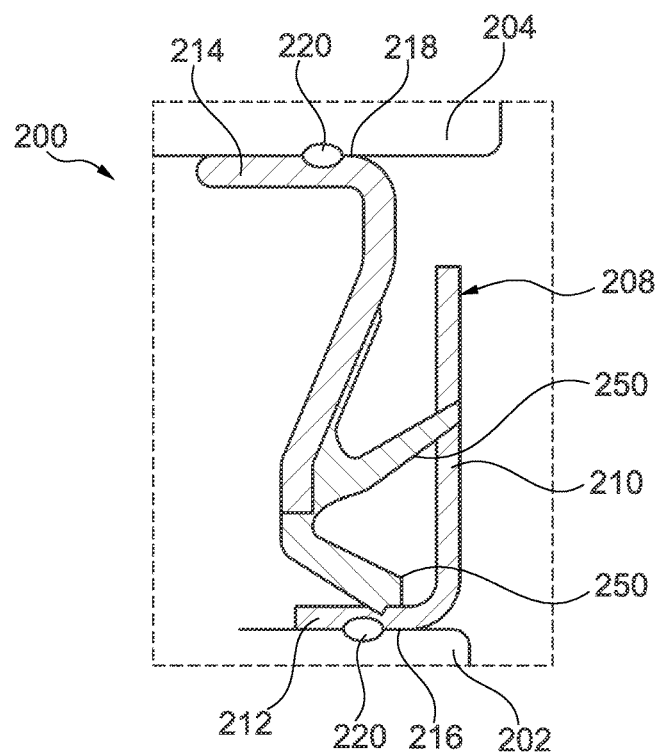
FIG. 5 is a cross-section of another roller bearing assembly including bead seals on the seal, according to an embodiment.
Figure 6:
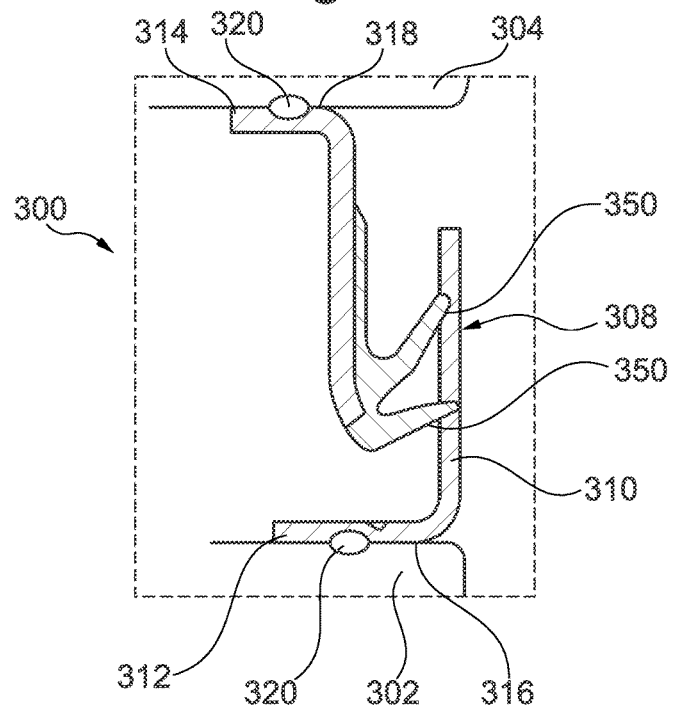
FIG. 6 is a cross-section of yet another roller bearing assembly including bead seals on the seal, according to an embodiment.

With reference to FIGS. 5 and 6, two additional examples of bead seals for roller bearing assemblies are shown. These additional examples demonstrate that the disclosed bead seals may be applied to a variety of roller bearing and seal designs. Like elements are identified with corresponding numerals. For example, inner rings 202 and 302 of assemblies 200 and 300 may correspond to inner ring 102 in assembly 100. The seals 108, 208, and 308 have differing shapes and designs and are intended to show that the bead seals may be incorporated into any bearing design regardless of the specific configuration. The seals 208 and 308 each include metal bodies 210 and 310, as well as rubber elements 250 and 350, respectively. As is understood by those of skill in the art, the shape and number of rubber elements may vary from one seal design to another. One of ordinary skill in the art will, based on the present disclosure, be able to incorporate the bead seals into a wide variety of bearing seals.

Figure 7A:
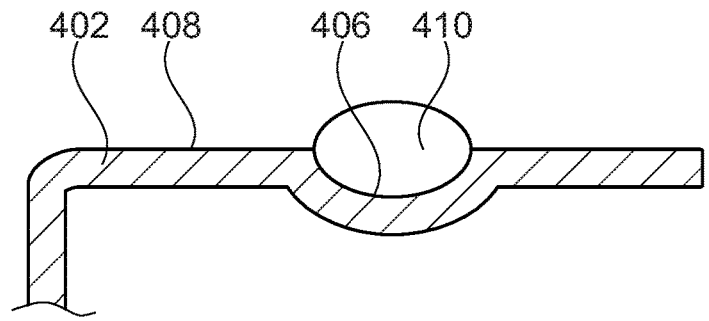
FIG. 7A is cross-section of a first component including a bead seal prior to compression, according to an embodiment.
Figure 7B:
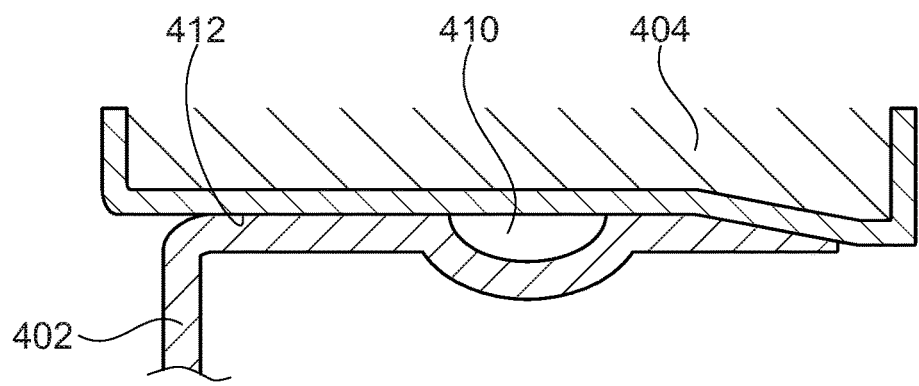
FIG. 7B is a cross-section of the first component of FIG. 7A press-fit into a second component, according to an embodiment.

With reference to FIGS. 7A and 7B, an assembly 400 is shown including a first component 402 coupled to a second component 404 (e.g., a housing), for example, by a press-fit. FIG. 7A shows the first component 402 prior to being press-fit into second component 404. First component 402 may include a groove 406, which may be similar to grooves 52/122 described above. The groove 406 may be formed in an outer surface 408 of the first component 402, or any surface that is configured to contact another component during a press-fit. A bead seal 410 may be disposed in the groove 406, the bead seal 410 may be similar to the bead seals 50/120/220/320 described above. Similar to the other disclosed bead seals, bead seal 410 may be over-molded onto the groove 406 or may be disposed therein in by other methods.

As shown in FIG. 7B, the first component 402 may be press-fit into the second component 404 such that the bead deal 410 is compressed between the groove 406 in the first component 402 and a surface 412 of the second component 404. In one embodiment, both the first and second component are formed of metal, such as steel. The surfaces 408 and 412 may be annular or circumferential surfaces, such as those above with respect to bearing assemblies, however, that is not required. As described above, the disclosed bead seals may be used in a variety of applications, including bearing assemblies, but also in other applications where metal-on-metal sealing surfaces exist (or may be newly created due to the disclosed bead seals). In general, the disclosed bead seals may be used to seal any enclosure where one component is inserted (e.g., by press-fit) into another component. Non-limiting examples of such applications may include sealing shafts, cylinders, gear boxes, transmissions, gear casings, power steering pumps, power steering pinions, axles, oil/grease lubricated systems, or others. The bead seals may be applied to any components therein to seal to other components therein or to a housing.

The disclosed bead seals may address issues that may occur with conventional seals. For example, metal sealing components (e.g., a flinger) may traditionally be at least partially encased by an elastomer/rubber material. However, when the sealing component is pressed into position, the elastomer may move from its intended position and the seal may be lost. In another approach, two metal sealing components may be press-fit together without any elastomer material. This may form an interference fit where neither component moves, however, the seal between the components may be poor. The disclosed approach combines the benefits of the conventional approaches and removes or mitigates the drawbacks. A metal-on-metal press-fit may still be formed between the two components without movement therebetween. In addition, the bead seal may be formed in a groove in one component, locating/retaining the bead seal and allowing it to compress into the groove without dislodging during the pressing operation. The compressed bead seal forms a positive seal surface with the opposing component. The disclosed bead seals may improve existing seal assemblies, which may have relatively tight tolerances to reduce leakage. In addition, the disclosed bead seals may allow for reduced tolerances in some applications, due to the compressible bead seal's ability to conform to the seal gap size. This may reduce machining or other production costs and/or speed up production due to reducing processing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing assembly, comprising:
   an inner ring, an outer ring, and a plurality of rolling elements supported therebetween;
   the inner ring is integrally formed with a wheel bearing flange oriented in a direction substantially parallel to a radial direction of the bearing assembly;
   an annular seal disposed between the inner and outer rings, the seal including a metal portion having a mating surface configured to contact a wall of the inner ring; and
   wherein the metal portion includes a first mating surface oriented in the direction substantially parallel to the radial direction and a second mating surface oriented in a direction substantially perpendicular to the radial direction, the first and second mating surfaces configured to contact corresponding first and second walls of the inner ring; and
   a bead seal secured to each of the first and second mating surfaces, the bead seals contacting and forming a seal between the first and second mating surfaces and the first and second walls of the inner ring, respectively.

2. The bearing assembly of claim 1, wherein the first and second mating surfaces each have an annular groove defined therein and the bead seals are disposed within the grooves.

3. A method, comprising:
   forming a seal including a metal portion having a mating surface configured to contact a wall of an inner ring of a bearing assembly;
   securing a bead seal to the mating surface around a circumference of the seal;
   introducing the seal into the bearing assembly such that the bead seal contacts and forms a seal between the mating surface and the wall of the inner ring;
   forming a second metal portion of the seal having a second mating surface configured to contact a wall of the inner ring or a wall of the outer ring;
   securing a second bead seal to the second mating surface around a circumference of the seal; and
   introducing the seal into the bearing assembly such that the second bead seal contacts and forms a seal between the second mating surface and either the wall of the inner ring or the wall of the outer ring.

4. The method of claim 3, wherein the bearing assembly is a wheel bearing assembly and the mating surface is configured to contact a wall of the inner ring that is oriented parallel to a radial direction of the wheel bearing assembly and the second mating surface is configured to contact a wall of the inner ring that is oriented perpendicular to the radial direction.

5. The method of claim 3, wherein the mating surface is configured to contact a wall of the inner ring that is oriented perpendicular to a radial direction of the bearing assembly and the second mating surface is configured to contact a wall of the outer ring that is oriented perpendicular to the radial direction.

\* \* \* \* \*